United States Patent [19]

Bair et al.

[11] Patent Number: 4,965,129

[45] Date of Patent: Oct. 23, 1990

[54] ARTICLE FOR ABSORBING LIQUIDS

[75] Inventors: Thomas I. Bair; Dimitri P. Zafiroglu, both of Wilmington, Del.

[73] Assignee: E. I. Du Pont de Nemours and Company, Wilmington, Del.

[21] Appl. No.: 388,196

[22] Filed: Aug. 1, 1989

Related U.S. Application Data

[60] Division of Ser. No. 139,746, Jan. 15, 1988, abandoned, which is a continuation-in-part of Ser. No. 12,400, Feb. 9, 1987, abandoned.

[51] Int. Cl.$^5$ ................................................ B32B 3/06
[52] U.S. Cl. ................................ 428/398; 210/502.1; 210/691; 210/924; 428/36.1; 428/224; 428/240; 428/283; 428/327; 428/340; 428/365; 428/372; 428/376
[58] Field of Search ..................... 428/913, 36.1, 224, 428/372, 357, 376, 398, 365, 240, 241, 253, 102, 105, 257, 283, 297, 229, 327, 340; 210/691, 502.1, 924, 242.4, 680, 693

[56] References Cited

U.S. PATENT DOCUMENTS

| | | | |
|---|---|---|---|
| 3,169,899 | 2/1965 | Steuber | 564/503 |
| 3,227,784 | 3/1965 | Blades et al. | 264/53 |
| 4,052,306 | 10/1987 | Schwartz et al. | 210/242 |
| 4,070,287 | 1/1978 | Wiegand et al. | 210/40 |
| 4,240,416 | 12/1980 | Benecke | 128/156 |
| 4,458,042 | 7/1984 | Espy | 524/14 |
| 4,497,712 | 2/1985 | Cowling | 210/924 |
| 4,537,733 | 9/1985 | Farago | 264/9 |
| 4,600,545 | 7/1986 | Galli et al. | 264/13 |
| 4,659,478 | 4/1987 | Stapelfeld | 210/924 |

FOREIGN PATENT DOCUMENTS 891945 3/1962 United Kingdom .

OTHER PUBLICATIONS

Kirk-Othmer, Encyclopedia of Chemical Technology, vol. 19, 3rd Ed., John Wiley & Sons, Inc., p. 420ff (1982).

*Primary Examiner*—Lorraine T. Kendell

[57] ABSTRACT

A sausage-shaped liquid-absorbing article is provided which includes within a porous fabric fine, fibrous particles of flash-spun polyethylene, optionally particles of foamed organic polymer, and an effective amount of a wetting agent. The article is capable of absorbing oils or aqueous liquids in amounts equal to at least six times the weight of the particles.

16 Claims, No Drawings

ARTICLE FOR ABSORBING LIQUIDS

This is a division of application Ser. No. 139,746, filed Jan. 15, 1988, now abandoned; which is a continuation-in-part of application Ser. No. 012,400, filed Feb. 9, 1987, now abandoned.

BACKGROUND OF THE INVENTION

1. Field of the Invention

This invention relates to a liquid-absorbing article that has a porous outer fabric which surrounds an absorbent material that includes fine, fibrous polyolefin particles. More particularly, the invention concerns such an article in which the polyolefin particles are of flash-spun polyethylene and the absorbent material includes a wetting agent. The article of the invention exhibits particularly useful absorption characteristics for aqueous liquids, solvents and oils.

2. Description of the Prior Art

Liquid-absorbing articles in which ground corn cobs and chaff form an absorbent material within a porous, knitted or woven fabric which is closed at each end are known, for example from Stapelfeld et al, U.S. Pat. No. 4,659,478. Such articles, in which the ground corn cobs and chaff are replaced by melt-blown polypropylene microfibers, have been used commercially to absorb solvents, oils or aqueous spills from floors and to prevent spilled liquids from spreading. The articles also have been used on or at the base of machines, such as lathes, milling machines, cutters, metal-cleaning solvent baths, and the like. These machines employ liquids for cooling, cleaning or the like. The liquids are prone to splatter or spill in normal use. To be satisfactory for these uses, the liquid-absorbing article should be conformable to the surface on which it is placed and should be readily bendable so that one or more of such absorbing articles can be used to easily surround the liquid, form a dam and prevent spreading of the liquid on the surface. After the liquid-absorbing article has become full or saturated, it should not show a tendency for significant dripping when the article is lifted out of the liquid it is absorbing. The absence of dripping allows the article to be placed safely into a container for subsequent suitable disposal.

The above-described liquid-absorbing articles have been used with some success in industry. However, the utility of these liquid-absorbing articles could be considerably enhanced, if an absorbent of lighter weight could be made to absorb as much liquid as rapidly as the commercially used absorbers. Further, the commercial liquid-absorbing articles tend to compact on storage before use. Such compaction is undesirable; it apparently causes the article to become less absorbent and less conformable.

Other types of liquid-absorbing articles have been suggested for removing oils from water, as might be encountered in a water-polluting oil spill. For example, Wiegand et al, U.S. Pat. No. 4,070,287, discloses a sorbent material comprising a blend of 25-90% by weight of polymeric fibers of less than 40 microns in diameter and 5-75% cellulosic fibers formed into a bonded or nonbonded web or mat-like structure or merely blended and inserted into a fine mesh net-like enclosure. Ground polyethylene foams are also disclosed for the polymeric fibers. As another example, Schwartz et al, U.S. Pat. No. 4,052,306, discloses a floatable device for sweeping oil from the surface of a body of water. The device includes a netting that holds a web of melt-blown polymeric microfibers (preferably of less than 10 μm in diameter) of polyolefin, polystyrene, polyester or polyamide. Although these articles might be helpful in clean-up of oil spills, such articles generally are inadequate for aqueous spills.

Accordingly, an object of this invention is to provide an improved liquid-absorbing article which is suitable for absorbing oily or aqueous liquids.

SUMMARY OF THE INVENTION

The present invention provides an improved liquid-absorbing article of the type that has a porous outer fabric enclosing an absorbent material which includes fine, fibrous polyolefin particles. In accordance with the improvement of the present invention, at least 50% by weight of the fine, fibrous polyolefin particles is composed of flash-spun polyethylene, preferably of oriented linear polyethylene, and the absorbing material includes an effective amount of a wetting agent. In a preferred embodiment of the invention, substantially all of the absorbent particles are of flash-spun polyethylene. In another embodiment, the absorbing material includes no more than 50% by weight of foamed particles of an organic polymer, the foamed polymer preferably being of polypropylene. The absorbent material has a bulk density which is preferably in the range of 0.045 to 0.075 g/cm$^3$, most preferably in the range of 0.05 to 0.07 g/cm$^3$. A preferred nonionic wetting agent is an alkyl phenoxy polyethylene oxide surfactant. Another preferred wetting agent is an amphoteric derivative of coconut acid. The wetting agent usually amounts to between 0.5 and 5%, preferably between 2 and 4%, by weight of the fibrous polyolefin particles. The improved liquid-absorbing article of the invention can absorb oil or an aqueous liquid in amounts equal to at least six times the weight of the absorbing material.

DETAILED DESCRIPTION OF PREFERRED EMBODIMENTS

In accordance with the present invention, the liquid absorbing article of the invention comprises a porous outer fabric which surrounds an absorbent material which includes fine, fibrous, polyolefin particles. The fabric can be knitted or woven or nonwoven. The porosity of the fabric needs only to be sufficient for the liquid which is to be absorbed to seep through readily to the absorbing material on the inside of the fabric. Preferably, the fabric is made of an olefin polymer, such as polyethylene, but most preferably of polypropylene. The fabric surrounding the absorbent material usually is sausage-shaped, that is, generally cylindrical with its ends closed to contain the absorbent material. Any convenient known type of closure device is satisfactory, such as sewn seams, polymeric or metallic wires, elastomeric bands and the like.

The absorbent material which fills the sausage-shaped outer fabric can be composed (except for the wetting agent) substantially entirely of fine, fibrous particles of flash-spun polyethylene. The polyethylene, preferably is a linear polyethylene polymer, and the particles preferably are in the form of oriented polymeric, film-fibril elements, generally of less than 2-micron thickness. Such particles of polyethylene may be prepared by flash-spinning techniques as disclosed in British Patent No. 891,945 and Blades & White U.S. Pat. No. 3,227,784, and such disclosures are incorporated herein by reference. Another convenient source of this particulate matter is nonbonded, lightly consolidated polyethylene nonwoven sheet made in accordance with the general teaching of Steuber, U.S. Pat. No. 3,484,899 or of Farago, U.S. Pat. No. 4,537,733, the disclosures of which are incorporated herein by reference. The sheet is cut into small pieces (e.g., with a granulator) and then further reduced in size (e.g., with a turbo-mill) to form the desired fine fibrous particles.

Fine, fibrous particles of polyethylene suitable for use in the liquid-absorbing articles of the present invention are also available in the form of synthetic pulps (see Kirk-Othmer: Encyclopedia of Chemical Technology, Volume 19, Third Edition, John Wiley & Sons, page 420 ff, 1982). Among suitable commercial synthetic polyethylene pulps are "Pulpex" or "Fybrel", made respectively by Hercules Corp. of Wilmington, Delaware and Mitsui Petrochemical Industries Ltd. of Tokyo, Japan. However, particles of flash-spun, oriented, linear polyethylene of the kind mentioned in the preceding paragraph are preferred because of their generally superior liquid-absorption characteristics.

In addition to the fine, fibrous, polyethylene particles, the absorbent material must have incorporated with it an effective amount of a wetting agent. As used herein, effective amount means a concentration of wetting agent that enhances the absorption capacity of the absorbing material so that it can absorb in one hour at least six times its own weight of an oil or of an aqueous liquid. When absorbing aqueous liquids, the effective amount of wetting agent permits the material to absorb that amount of liquid in much less than an hour, usually in 5 to 15 minutes. Generally, the effective amount of wetting agent is in the range of 0.5 to 5% by weight of the absorbent particles. The preferred amount of wetting agent is in the range of 2 to 4%.

A wide variety of wetting agents are suitable for use in the liquid-absorbing articles of the invention. These include nonionic, anionic, cationic and amphoteric surfactants. Nonionic surfactants are preferred. Alkyl phenoxy polyethylene oxides are particularly preferred. Such particularly preferred surfactants are available commercially (e.g., "Triton" X-114 sold by Rohm & Haas).

Usually, the wetting agents that are useful for the present invention reduce the surface tension of water to a value of no greater than 40 dynes/cm, preferably to a value in the range of 25 to 35 dynes/cm. However, certain surfactants sometimes do not perform as well as might be expected simply from their effects on surface tension. For example, certain fluorochemical surfactants which reduce the surface tension of water to less than 25 dynes/cm (e.g., Zonyl-FSN) do not assist the absorption of liquids as much as would be expected simply from the surface tension values. Accordingly, a convenient method has been devised for quickly and easily determining whether a particular wetting agent would be a good candidate for use in a liquid-absorbing article of the invention. A pinch of absorbent material, weighing about 25 milligrams and containing the wetting agent to be tested, is consolidated and lightly rolled into a little ball between ones thumb and forefinger. Then, the ball is dropped onto the surface of clean tap water. If the ball becomes completely wet in about three seconds, the test wetting agent is usually suited for use in the present invention and worthy of further evaluation. If the ball remains afloat and is substantially unwetted, even after 5 seconds, the test wetting agent usually is not satisfactory for use in the present invention.

The wetting agents listed in the following tabulation are typical of those tested for use in the present invention. The surface tension values ($\epsilon$) in dynes per cm are those quoted by the manufacturers of the agents. The results of the 25-mg-ball-wetting test are also reported in seconds ($\theta$) until wetting.

TABLE

| Agent | Wetting Agents Type | $\gamma$ | $\theta$ |
|---|---|---|---|
| "Zonyl" FSN[1] | nonionic | 23 | >5 |
| "Triton" X-114[2] | nonionic | 29 | <3 |
| "Igepol" RC-620[3] | nonionic | <35 | <3 |
| "Miranol" C2M-SF[4] | amphoteric | 30 | <3 |
| "Witconate" 93-2[5] | anionic | <35 | <3 |

Notes:
[1] Fluorochemical surfactant sold by E. I. du Pont de Nemours and Company.
[2] Alkylphenoxy polyethylene oxide surfactant sold by Rohm & Haas.
[3] Alkylphenoxy poly(oxyethylene)ethanol surfactant sold by General Anilin and Film.
[4] Amphoteric derivative of coconut acid sold by Miranol, Inc. of Dayton, N.J.
[5] Amine alkylaryl sulfate sold by Witco Chemical Corporation.

Optionally, the absorbent material may also contain up to 50% by weight of foamed organic polymer particles. Usually, the absorbent material includes no more than about 45% by weight of the foamed particles Small amounts of foamed particles usually are blended with the flash-spun polyethylene particles. These foamed particles apparently permit freer flow of the absorbent material, when it is loaded into the outer fabric, as compared to an absorbent material composed entirely of flash-spun polyethylene particles. Also, once loaded in the fabric, the foamed particles also apparently prevent undesired compaction of the absorbent material. Among suitable polymers for the foamed particles are polypropylene, polyester, polystyrene and the like. Particularly preferred are flash-spun microfoam particles of polypropylene prepared by the general techniques of Blades and White U.S. Pat. No. 3,227,664, the disclosure of which is incorporated herein, by reference. In accordance with the present invention, whether the absorbent material is a particle blend of foamed polymer and flash-spun polyethylene or of flash-spun polyethylene alone, the preferred range for the apparent bulk density (defined hereinafter) of the absorbent material usually is from 0.045 to 0.075 grams/cm$^3$, most preferably, from 0.05 to 0.07 g/cm$^3$. As shown by the data in the examples below, the liquid-absorbing articles of the invention are capable of rapidly absorbing aqueous liquids in amounts equal to at least seven or more times the weight of the absorbing material. Such absorptions are achieved within 5 to 15 minutes of the time the liquid-absorbing article of the invention is placed in contact with the aqueous liquid. Also, the liquid-absorbing article of the invention is capable of absorbing oils in amounts equal to at least six times the weight of the absorbing material, albeit the rates of absorption of oils, because of their higher viscosity, are much slower than those of the aqueous liquids.

Preparation of flash-spun polyethylene particles

In the examples which follow, fibrous, flash-spun polyethylene particles were prepared from a nonwoven sheet obtained by the method of Farago, U.S. Pat. No. 4,537,733. Linear polyethylene, having a density of 0.95 g/cm$^3$, a melt index of 0.9 (as determined by ASTM method D 1238-57T, Condition E), and melting below 135° C., was flash spun from a 12% solution of the polymer in trichlorofluoromethane. The solution was continuously pumped to spinneret assemblies at a temperature of 179° C. and a pressure above about 85 atmospheres. The solution was passed in each spinneret assembly through a first orifice to a pressure let-down zone and through a second orifice into the surrounding atmosphere. The resulting strand or plexifilament was a three-dimensional plexus of interconnecting, film-fibril elements of random length. The film-fibril elements had the form of thin ribbons of less than 4 microns in thickness. The strand was spread and oscillated by means of a rotating shaped baffle, was electrostatically charged and then deposited on a moving belt. The spinneret assemblies were spaced to provide overlapping, intersecting deposits on the belt to form a sheet. The sheet was then lightly consolidated by passage through the nip of rollers that applied a compression of about 1.8 kg per cm of sheet width. The lightly consolidated sheets had a unit weight in the range of 25 to 75 g/m$^2$ and a density in the range of 0.15 to 0.3 g/cm$^3$.

The thusly produced lightly consolidated sheet was slit into strips The strips were cut into short lengths by means of a rotating knife cutter. The short lengths were then chopped into smaller pieces in a granulator. A Sprout-Bauer DSF-1518 granulator was employed The chopped pieces, which passed through a screen having 0.48 by 0.48-cm openings, were further reduced in size in a turbo-mill. A Model 3A Ultra-Rotor mill (distributed by Industrial Process Equipment Co. of Pennsauken, New Jersey) having blades of 71-cm (28-in) diameter, was operated at 2100 rpm rotation speed, with a blade clearance of about 3 mm (i.e., in the range of 1–5 mm). A wetting agent was added to the turbo-mill to provide a 2% concentration of the agent based on the weight of the polyethylene. The resultant fibrous polyethylene particle pulp exhibited a drainage factor of 0.12, a Bauer-McNett classification value of 53% on a 14 mesh screen, and a surface area of 1.7 m$^2$/g. Drainage factor was determined in accordance with a modified TAPPI T221 OS-63 test, as disclosed in U.S. Pat. No. 3,920,507. Classification value was determined in accordance with TAPPI T33 OS-75. TAPPI refers to the Technical Association of Paper and Pulp Industry. Surface area was measured by the BET nitrogen absorption method of S. Brunauer, P. H. Emmett and E. Teller, *J. Am. Chem. Soc.*, V. 60, 309–319 (1938).

Preparation of flash-spun polypropylene foam particles

The polymeric foam used in the illustrative samples of Example 2 below was made in accordance with the general procedures of Blades and White, U.S. Pat. No. 3,227,664. The foamed fiber was prepared by flash-spinning polypropylene ("Profax" manufactured by Hercules of Wilmington, Delaware) having a melt flow rate of 3.0 grams per 10 minutes measured in accordance with ASTM 1238(L). ASTM refers to American Society for Testing Materials The polypropylene polymer was melted and mixed with methylene chloride solvent to form a solution having 20 parts polymer and 19 parts solvent by weight. The solution, at a pressure of 1,072 psig (7,386 kPa) and a temperature of 194° C., was then passed through a spinneret of 0.025-cm diameter to form foamed filament which had a density of 0.02 g/cm$^-$. The filament was cut into short lengths in the range of 0.16 to 0.95 cm. The thusly produced short fibers were used in the tests reported in the Example 2 below.

Test Procedures

Convenient methods were employed for measuring (1) the bulk density of the absorbent material, (2) the specific absorption of the absorbent material, a measure of its ability to absorb liquid and (3) the ability of the liquid-absorbing article to retain absorbed liquid.

Bulk density of the absorbent material was measured by pouring a hand-mixed sample of the particles of absorbent material into glass cylinder of about 6½ cm in diameter until a volume of 535 cm$^3$ was reached. This volume corresponds to the filled volume of the sausage-shaped liquid-absorbing specimens used for the tests reported in the examples. The weight of the absorbent material in grams divided by the 535 cm$^3$ volume defined the bulk density of the absorbent material.

The ability of the liquid-absorbing material to absorb liquid was measured as follows. The liquid to be absorbed was poured into a rectangular pan measuring about 20 cm by 13 cm in cross-section until a depth of about 1.3 cm of liquid was reached. A pre-weighed sausage-shaped test specimen containing liquid-absorbing material and having a diameter of about 6.7 cm and a length of about 15 cm between end closures was placed in the pan to absorb the liquid for a given time interval and then removed from the liquid, held over the pan for a few seconds until the liquid stopped dripping from the specimen and then reweighed. The volume of liquid in the pan was replenished to the 1.3-cm liquid depth. The same test specimen is then replaced in the pan and the test repeated for additional time intervals. In the examples, as summarized in Tables I and II, the test was repeated four times to obtain determinations of the total amount of liquid absorbed in 1, 5, 15 and 60 minutes. The "specific absorption" reported in the tables is the ratio of the weight of liquid absorbed to the weight of absorbent material, after 60 minutes of absorption.

The ability of the liquid-absorbing material to retain absorbed liquid is given in the examples as "% R". The % R or absorbed liquid retention is defined as the weight of absorbed liquid retained in the test specimen, after being removed from the liquid and being suspended over the pan for about 5 minutes to allow liquid that would not be retained in the specimen to drip from the test specimen, divided by the weight of liquid absorbed after 60 minutes (as measured in the liquid absorption test), expressed as a percentage.

EXAMPLE I

This example illustrates the higher rates and total amounts of liquid absorption achieved by a liquid-absorbing article of the invention over a commercial prior-art device intended for absorbing spilled liquids. The advantage of the present invention is demonstrated with absorption of water, an aqueous acid, an aqueous base, a solvent and an oil.

The liquid-absorbing particles of the invention were prepared by the general method described above, wherein a non-bonded sheet of plexifilamentary strands of flash-spun, oriented film-fibril elements was cut into small pieces, then reduced in size in a turbo-mill and treated with "Triton X-114 nonionic surfactant to form the absorbing material The surfactant amounted to 2% by weight of the absorbing material The absorbing material in the commercial article (made by New Pig Corporation of Altoona, Pennsylvania) was composed of fibrous particles of melt-blown polypropylene.

To compare the liquid-absorbing material of the invention with the liquid-absorbing material of the commercial article, each absorbing material was placed inside the same type of porous fabric. The fabric was of knitted polypropylene fibers and measured about 6.7 cm in diameter and about 20 cm in length. The fabric was obtained by emptying some of the commercial sausage-shaped articles and then cutting them into the desired lengths. Rubber bands, located about 2.5 cm from each end of the fabric, were used for closures. Each specimen fabric weighed between 4 and 5 grams.

The ability of the test specimens to absorb various types of liquids was measured in accordance with the liquid-absorption tests described hereinbefore. Five liquids were used: (a) tap water, (b) 10% sulfuric acid, (c) 10% sodium hydroxide, (d) trichloroethylene solvent and (e) DTE hydraulic oil from Mobil Oil Company, having a pour point of −29° C., a flash point of 204° C. and an SUS viscosity of 155 at 38° C. and of 44 at 99° C. The test results are summarized in Table I.

TABLE I

Liquid Absorption - Invention versus Prior Art

| | Absorbent Mat'l | | Liquid Absorbed[1] in given minutes | | | | Specific |
|---|---|---|---|---|---|---|---|
| Liquid | Weight grams | Density g/cm$^3$ | 1 | 5 | 15 | 60 | Absorb.[2] |
| A. Flash-spun polyethylene absorber of the invention | | | | | | | |
| Water | 35.0 | 0.065 | 235 | 315 | 319 | 320 | 9.1 |
| Acid | 34.9 | 0.065 | 324 | 330 | 329 | 329 | 9.4 |
| Base | 35.1 | 0.066 | 264 | 350 | 350 | 350 | 10.0 |
| Solvent | 35.1 | 0.066 | 298 | 369 | 367 | 366 | 10.4 |
| Oil | 35.0 | 0.065 | 57 | 124 | 185 | 268 | 7.7 |
| B. Comparison: Melt-blown polypropylene absorber | | | | | | | |
| Water | 51 | 0.095 | 248 | 300 | 306 | 305 | 6.0 |
| Acid | 47.8 | 0.089 | 216 | 269 | 272 | 274 | 5.7 |
| Base | 50.4 | 0.094 | 302 | 326 | 325 | 322 | 6.4 |
| Solvent | 48.2 | 0.090 | 282 | 303 | 310 | 312 | 6.4 |
| Oil | 55 | 0.103 | 50 | 91 | 142 | 212 | 3.9 |

Notes to Table I:
[1] Grams of liquid absorbed in a given time.
[2] Specific Absorb. = Specific Absorption in grams of liquid absorbed in 60 minutes per gram of absorbing material.

The test results show that specimens of the invention, each of which contained the flash-spun polyethylene particles, absorbed more liquid than the specimens of the known variety, each of which contained the melt-blown polypropylene particles, even though the specimens of the invention contained fewer grams of absorbing material. The absorption per gram of absorbing material (Specific Absorption) was between about 1½ to almost 2 times as great for specimens of the invention than for those containing melt-blown polypropylene particles. Thus, specimens of the invention performed the same liquid-absorption job more effectively and with less absorbing material.

EXAMPLE 2

This example shows the effect on oil and water absorption of including foamed organic polymer particles along with flash-spun polyethylene particles in the absorbent material of the liquid-absorbing articles. A series of samples were made in the same manner as in Example 1, except that the composition of the absorbent material was varied from 100% flash-spun polyethylene particles and 0% foamed organic polymer particles to 100% foamed organic polymer particles and 0% flash-spun polyethylene particles. The foamed organic polymer particles were prepared by the method described above (just before the section on "Test Procedures"). The oil and water absorption characteristics of the specimens were determined as in Example 1. Liquid retention characteristics were also determined. Table II summarizes the test results.

TABLE II

Effect of Foam Particles in Absorbent Material

| | Absorbent Material | | Liquid Absorbed[1] in given minutes | | | | | |
|---|---|---|---|---|---|---|---|---|
| % Foam | Weight grams | Density g/cm$^3$ | 1 | 5 | 15 | 60 | Spec. Abs.[2] | % R[3] |
| A. Absorption of Water | | | | | | | | |
| 0 | 34.8 | 0.065 | 216 | 284 | 290 | 293 | 8.4 | 100 |
| 25 | 30.2 | 0.056 | 212 | 236 | 243 | 248 | 8.2 | 99 |
| 50 | 25.0 | 0.047 | 183 | 229 | 234 | 234 | 9.4 | 4 |
| 75 | 19.9 | 0.037 | 104 | 158 | 176 | 178 | 8.9 | 4 |
| 100 | 21.9 | 0.041 | 26 | 58 | 70 | 72 | 3.3 | 32 |
| B. Absorption of Oil | | | | | | | | |
| 0 | 35.0 | 0.065 | 57 | 124 | 185 | 268 | 7.7 | 100 |
| 24 | 33.0 | 0.062 | 67 | 114 | 160 | 207 | 6.3 | 97 |
| 29 | 28.2 | 0.053 | 50 | 86 | 126 | 177 | 6.3 | 98 |
| 35 | 23.2 | 0.044 | 62 | 98 | 132 | 157 | 6.8 | 92 |
| 55 | 22.5 | 0.042 | 55 | 81 | 109 | 140 | 6.2 | 92 |
| 73 | 18.4 | 0.034 | 54 | 79 | 98 | 121 | 6.6 | 86 |
| 100 | 14.6 | 0.027 | 44 | 62 | 88 | 108 | 7.4 | 78 |

Notes:
[1] Liquid absorbed (see Table I Notes).
[2] Specific Absorption (see Table I Notes).
[3] % R = percent of absorbed liquid retained
[4] No measurement made.

The results summarized in Table II show that substituting foamed polymeric particles for some of the flash-spun polyethylene particles of the absorbent material can reduce the total weight of the absorbent material in the liquid-absorbing article by a larger percentage than the percentage reduction in total amount of liquid absorbed caused by the substitution. Further, this substitution, within the concentrations suggested by the present invention, generally causes no serious detriment to the specific absorption of the absorbent material. However, as shown by the data in the table, as well as by other tests, the absorbed liquid retention generally is below 90% when the % foam in the absorbent material is greater than about 50–60% and the density of the absorbent material is below 0.040 g/cm$^3$.

Similar results were obtained when the polypropylene foam particles of this example were replaced by foam particles of styrene, polypropylene, polyethylene terephthalate and the like.

EXAMPLE 3

A liquid-absorbing article was prepared by the procedures of Example 1, except that "Witconate" 93S, an amphoteric surfactant, replaced the nonionic surfactant of Example 1. The liquid absorption characteristics of the thusly prepared articles were determined as in Example 1, except that the base test liquid was 25% sodium hydroxide. The results, which are reported in Table III below, again demonstrate the very good liquid absorption characteristics of the absorbing articles of the invention.

TABLE III

Liquid Absorption

| | Absorbent Mat'l | | Liquid Absorbed[1] in given minutes | | | | Specific |
|---|---|---|---|---|---|---|---|
| Test Liquid | Weight grams | Density g/cm$^3$ | 1 | 5 | 15 | 60 | Absorb.[2] |
| Water | 29.9 | 0.057 | 216 | 292 | 287 | 288 | 9.6 |
| Acid | 30.0 | 0.057 | 240 | 308 | 309 | 309 | 10.3 |
| Base | 30.0 | 0.057 | 244 | 299 | 326 | 333 | 11.1 |

TABLE III -continued

| | Absorbent Mat'l | | Liquid Absorption | | | | |
|---|---|---|---|---|---|---|---|
| | | | Liquid Absorbed[1] in given minutes | | | | |
| Test Liquid | Weight grams | Density g/cm³ | 1 | 5 | 15 | 60 | Specific Absorb.[2] |
| Oil | 30.0 | 0.057 | 70 | 129 | 188 | 252 | 8.4 |

Notes:
[1] See Table I Notes.
[2] See Table I Notes.
[3] No measurement made.

We claim:

1. An improved liquid-absorbing article having a porous outer fabric of generally cylindrical shape which is closed at both ends and is substantially filled with an absorbent material which comprises fine, fibrous, polyolefin particles, wherein the improvement comprises at least 50% by weight of the fine, fibrous polyolefin particles being composed of flash-spun polyethylene and the absorbent material comprising an effective amount of a wetting agent.

2. An article in accordance with claim 1 wherein the bulk density of the absorbent material is in the range of 0.045 to 0.075 g/cm³.

3. An article in accordance with claim 2 wherein the bulk density is in the range of 0.05 to 0.07 g/cm³.

4. An article in accordance with claim 1, 2 or 3 wherein substantially all the particles of absorbent material are of flash-spun polyethylene.

5. An article in accordance with claim 4 wherein the flash-spun polyethylene particles are composed of oriented polyethylene polymer.

6. An article in accordance with claim 1 or 2 wherein no more than 50% by weight of the absorbent material is composed of particles of foamed organic polymer.

7. An article in accordance with claim 6 wherein the foamed organic polymer is selected from the group consisting of polypropylene, polyester and polystyrene or copolymers thereof.

8. An article in accordance with claim 1, 2 or 3 wherein the wetting agent amounts to between 0.5 and 5% of the total weight of the absorbent material.

9. An article in accordance with claim 1, 2 or 3 wherein the wetting agent amounts to between 2 and 4% of the total weight of the absorbent material.

10. An article in accordance with claim 1, 2 or 3 wherein the wetting agent has a surface tension of no greater than 40 dynes/cm.

11. An article in accordance with claim 10 wherein the surface tension is in the range of 25 to 35 dynes/cm.

12. An article in accordance with claim 8 wherein the wetting agent is an alkyl phenoxy polyethylene oxide nonionic surfactant.

13. An article in accordance with claim 8 wherein the wetting agent is an amphoteric derivative coconut oil.

14. An article in accordance with claim 1, 2 or 3 wherein the absorbent material has a specific absorption of at least six for oils or for aqueous liquids.

15. An article in accordance, with claim 14 wherein the absorbent material comprises at least 50% by weight of flash-spun oriented polyethylene particles, no more than 45% by weight of foamed polypropylene particles, and an alkyl phenoxy polyethylene oxide nonionic surfactant amounting to between 1 and 2.5% by weight of the absorbent material.

16. An article in accordance with claim 14 wherein the absorbent material comprises at least 50% by weight of flash-spun oriented polyethylene particles, no more than 45% by weight of foamed polypropylene particles, and an amphoteric derivative of coconut oil amounting to between 1 and 2.5% by weight of the absorbent material.

* * * * *